United States Patent [19]
Barrett et al.

[11] 3,825,757
[45] July 23, 1974

[54] NUCLEAR IMAGING SYSTEM

[75] Inventors: Harrison H. Barrett, Lexington; Frank A. Horrigan, Waltham, both of Mass.

[73] Assignee: Raytheon Company, Lexington, Mass.

[22] Filed: May 14, 1973

[21] Appl. No.: 360,223

Related U.S. Application Data

[63] Continuation of Ser. No. 194,382, Nov. 1, 1971, abandoned.

[52] U.S. Cl. .................. 250/363, 250/320, 250/323, 250/237 G, 250/368, 350/162 ZP, 350/211, 350/162 SF
[51] Int. Cl. ............................................. G01n 21/34
[58] Field of Search ........... 250/458, 460, 510, 515, 250/226, 237 R, 237 G, 363, 368, 320, 323; 350/162 ZP, 162 SF, 211; 353/20; 355/2

[56] References Cited
UNITED STATES PATENTS

| | | | |
|---|---|---|---|
| 3,011,057 | 11/1961 | Anger | 250/366 |
| 3,263,079 | 7/1966 | Mertz et al. | 350/162 ZP |
| 3,504,606 | 4/1970 | Moscovi | 350/162 SF |
| 3,667,831 | 6/1972 | Pennington | 350/162 SF |
| 3,669,528 | 6/1972 | Richardson | 250/237 |
| 3,748,470 | 7/1973 | Barrett | 250/320 |

*Primary Examiner*—James W. Lawrence
*Assistant Examiner*—Harold A. Dixon
*Attorney, Agent, or Firm*—Joseph D. Pannone; Milton D. Bartlett; David M. Warren

[57] ABSTRACT

A nuclear imaging system for mapping the source of high energy nuclear particles from a living organ which has selectively absorbed a radioactive compound by spatially coding the energy from the source in a Fresnel pattern on a detector and decoding the detector output to produce an image of the source. The coding is produced by a Fresnel zone plate interposed between the nuclear energy source and the detector whose position is adjustable with respect to the detector to focus the slices of the nuclear source on the detector. By adjusting the zone plate to a plurality of positions, data from a plurality of cross-sectional slices are produced from which a three-dimensional image of the nuclear source may be obtained.

20 Claims, 6 Drawing Figures

NUCLEAR IMAGING SYSTEM

This is a continuation of U.S. Pat. application Ser. No. 194,382, filed Nov. 1, 1971, now abandoned.

RELATED INVENTION

U.S. Pat. application Ser. No. 77,459 entitled Imaging System filed Oct. 2, 1970, by Harrison H. Barrett, now U.S. Pat. No. 3,748,470 and assigned to the same assignee as this invention is hereby incorporated herein by reference and made a part of this specification.

BACKGROUND OF THE INVENTION

Systems for detecting the location and condition of organs, such as the thyroid gland, in the human body for medical diagnostic purposes by measuring the absorption of a radioactive compound have heretofore required substantial doses of the radioactive material with inherent dangers to the patient since such equipments have captured only a small portion of the nuclear particles emitted from the organ. In addition, in order to get any substantial indication from the radioactive source, a substantial time of exposure to the detector is required during which the patient must remain immobile.

More specifically such equipment has been of two types, both of which use heavy energy absorbing structures between the nuclear source and the detector which absorbs the major portion of the nuclear particles. In one type, a thick body of nuclear energy absorbing material has a plurality of frusto-conical holes therethrough whose axes converge at a location outside the body which may be called a focal point. Since a nuclear source emits particles in all directions, a substantially larger percentage of particles emanating from a nuclear source which is positioned at the focal point will travel through the holes then the percentage of particles from a source displaced from the focal point. Therefore, by placing a detector on the opposite side of said body from the focal point, and counting the number of particles passing through the holes in the body, the relative concentration of nuclear radiating material in different regions of the source may be determined and by moving the body mechanically with respect to the source and repeating the counting for each new location of the focal point, a map of the location versus concentration of the nuclear source may be obtained.

Such a slow and tedious method of obtaining the outline of an organ which has absorbed a radioactive compound also has the disadvantage that the definition obtainable is, for practical reasons, low since for higher definition the counts must be made in a larger number of locations and a body with more holes of smaller size must be used. In addition such definition is also limited by secondary radiation or Compton scattering.

Another type of detector uses a thick body having a plurality of parallel cylindrical holes therethrough the diameter of said body being larger than the transverse dimension of the radioactive organ to be located. A converter such as a crystal converts the nuclear particles passing through the parallel apertures into sources of light which are detected by a plurality of spaced light detectors in a manner such that the relative intensity of the light produced by each nuclear energy particle which strikes each light detector is a measure of the location at which the particle strikes the converter. Since the location of the source of the nuclear particle is substantially along the axis of the particular cylindrical aperture in the body through which it passed, an individual recording of the location of each flash of light produced by each particle can be used to form an image of the radioactive organ. In such a system it is also necessary to use relatively large doses of radioactive material and to allow a substantial period of time to build up to a useful image. In addition, such a system provides substantially no information on the distance of the radioactive source from the detector and hence no three dimensional information.

SUMMARY OF THE INVENTION

In the aforementioned co-pending application there is disclosed a system for processing coded image data in which electronic correlation systems are used, such correlation systems being somewhat expensive and complicated.

This invention provides for a code which may be processed directly from the output of the detectors in real time with a minimum of equipment or, if desired, may be readily stored for later processing. More specifically, the invention provides for using a spatial code which is a surface of revolution of a nonlinear code, and preferably is a Fresnel zone plate having a two-dimensional pattern comprising at least portions of a series of rings of substantially equal area. The Fresnel zone plate is preferably a support plate of material which will transmit the nuclear particles having positioned thereon a plurality of rings of material which substantially absorb nuclear particles.

High definition images may be produced by decoding the output of the detectors in any desired manner such as by converting the signals to digital code and processing them through a digital computer in accordance with the desired algorithm to produce data from which an image of the source of nuclear particles may be constructed. Alternatively a signal from the detectors may be processed by an analogue computer such as an optical processor or a hypersonic surface wave structure.

This invention further discloses a particular data processing system in which advantage is taken of holographic phenomena to achieve an image of the nuclear source directly from the output of the detector. More specifically the output of the detector is suitably amplified and recorded on a photographic film by a cathode ray tube to produce a hologram. By using a zone plate having rotational symmetry to produce the coded pattern from which the film exposure is derived, and passing from a coherent source through the film and converging the light at a focal point, undesired component of the signal may be removed and the remaining light observed on a viewing screen positioned beyond the focal point.

Since information occurs in portions of the light which do not converge, a light absorbing disc may be used at the focal point to absorb those portions of the light which contain relatively small amounts of information. Alternatively, phase shifting of the central portion of the converged light or a combination of phase shifting and partial absorbing of the light may be used. Also, the entire beam of light may be passed through a second precoded hologram to compensate for undesired background signals generated, for example, from zone plate discontinuities irregularities or imperfections or for other systematic non-linearities.

If desired, an off-center section of a zone plate may be used and the light passing through the hologram produced on the film will, on convergence, produce three discs of light which are displaced laterally in the same relative direction as the center section of the zone plate is displaced from the axis of the camera. A first of the discs which is closest to the axis of the optical systems represents substantially continuous radiation and may be regarded as the equivalent of DC current giving a measure of the average intensity of the nuclear source. A second disc adjacent to the first disc corresponds to the real image of the nuclear source and the third disc corresponds to the virtual image of the nuclear source. By positioning a light absorbing plate having an iris whose diameter is slightly larger than each of the discs at the focal point of the three discs, any of the three discs may be selected. For example, if the real image is to be used, the iris is positioned to pass the real image to a viewing screen which is positioned at a distance beyond the iris depending on the focal length of the hologram.

This invention further discloses that image quality may be improved by making the object's spatial frequency spectrum, as measured at the image plane close to the same width as the spatial frequency spectrum of the zone plate as measured at the image plane. In addition, it is desirable that the minimum spacing in the zone plate be greater than the thickness of the opaque regions of the zone plate and that the detection system be capable of resolving such minimum spacing in the image plane. In addition it is desirable that the transverse dimension of the detector system be sufficient for a projection of the zone plate from a point source positioned at the center of the nuclear source to substantially fill the active region of the detector. More specifically, the aforementioned criteria may be satisfied by choosing a spacing between the rings such that the smallest spacing, that is the one between the outer ring and the next outer ring, is large enough that it can be resolved by the detection system and choosing the distance between the nuclear object and the zone plate and the distance between the zone plate and the detector such that the following equations are satisfied for a zone plate having circular zones alternately transparent and opaque to the radiation of interest. The radius of the $n^{th}$ edge in the plate is given by $$r_n = r_1 \sqrt{n},$$
$$n = 1, 2, \ldots N.$$

(1)

The zones therefore have equal area. The zone plate is called positive if the center is transparent and negative if it is opaque.

Let $f_{max}$ (obj) be the spatial frequency width of the object. The object is magnified by $S_2/S_1$, so its spectrum is multiplied by $S_1/S_2$. The maximum spatial frequency in the zone plate is approximately $$f_{max}(\text{zone plate}) \approx r_N/r_1^2 \approx 1/(2 \Delta r_N)$$

(2)

where;

$$\Delta r_N = r_N - r_{N-1} \approx r_1/2 \sqrt{N} = r_N/2N;$$

(3)

$S_1$ is the distance from the zone plate to the object;
$S_2$ is the distance from the image plane to the zone plate;
$f$ is spatial frequency; and
$r$ is the radius of a ring of the zone plate.

This invention further discloses that the zone plate should have a pattern such that its autocorrelation function, which may be determined by moving two identical zone plates across each other and measuring the transparency as a function of displacement, has a predominant transparency peak or valley whose average width is substantially less than the function of the zone plate itself. Alternatively, the zone plate should have a Fourier transfer function of the gamma ray transparency which has spatial frequencies substantially higher than the reciprocal of the maximum transverse dimension of the zone plate.

This invention further discloses that while the zone plate preferably has curved or arcuate zones such that the autocorrelation function is substantially similar in a plurality of directions and may in practice be a Fresnel zone plate consisting of rings of equal area separated by spaces of equal area, it is contemplated that any desired zone plate having the above mentioned autocorrelation function in at least two directions can be used.

This invention further discloses that by making the zone plate symmetrical, step function discontinuities at the center of the zone plate are minimized and/or eliminated. Also, the step function discontinuity signals introduced by the sudden cessation of the zone plate along its perimeter, with regions outside the zone plate being either opaque or transparent, can be reduced or eliminated from the final image by shading the transparency of the zone plate to make the spaces less transparent with the opaque regions remaining substantially opaque in the regions of the periphery of the zone plate. Alternatively, the intensity of the reproduced image and/or its focusing may be selectively reduced to make the hologram produced by the cathode ray tube for recording on film "fuzzy" in the region of the periphery of the pattern. This will reduce or eliminate the bright rings reproduced from the hologram which tends to mask the object being observed.

This invention further discloses that because the aperture available for all point sources in an extended body is substantially greater than the previous systems, a larger signal may be produced with a detecting system for the same dosage of nuclear compounds absorbed by a living organism than is possible with previous nuclear imaging systems and as a result, for a given definition of image a smaller dosage of radioactive compound need be ingested and/or a shorter period of time of immobility required during recording of the image than with previous systems.

Other and further features and advantages of the invention will become apparent as the description thereof progresses, reference being had to the accompanying drawings wherein.

Figure 1:
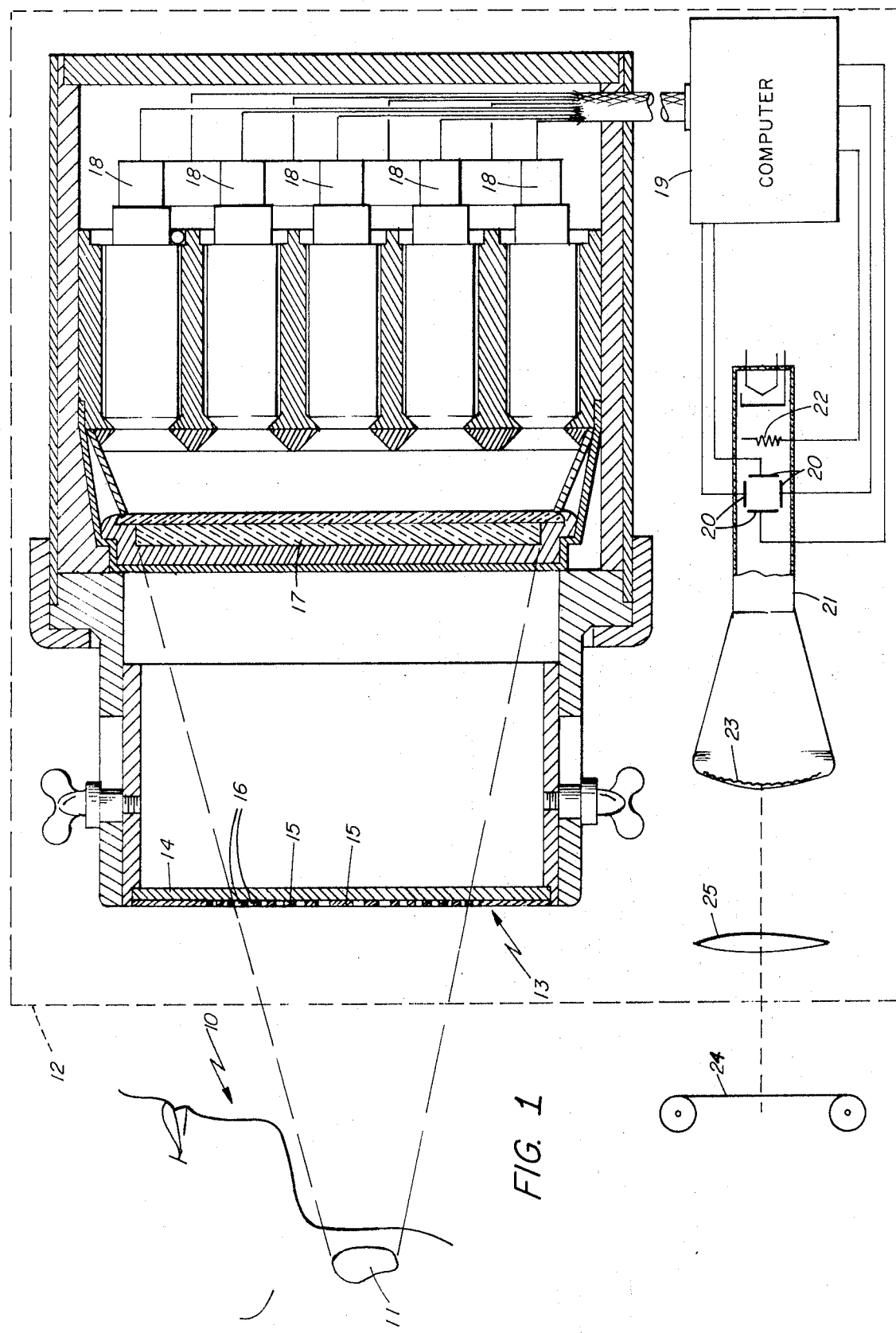
FIG. 1 illustrates a system for detecting and recording nuclear particle radiation in accordance with the invention.
Figure 2:
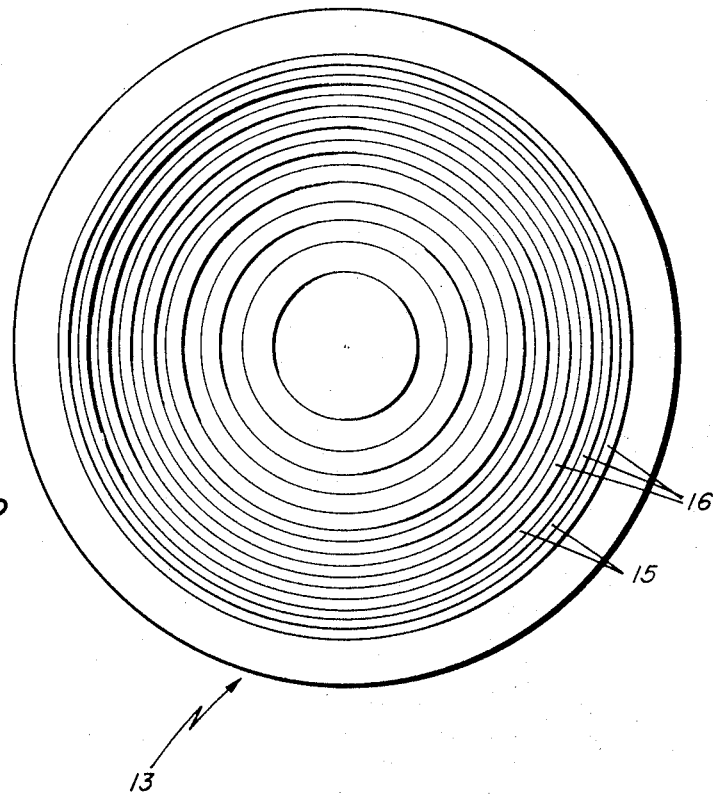
FIG. 2 illustrates a zone plate used to code the nuclear radiation in the system of FIG. 1.
Figure 3:
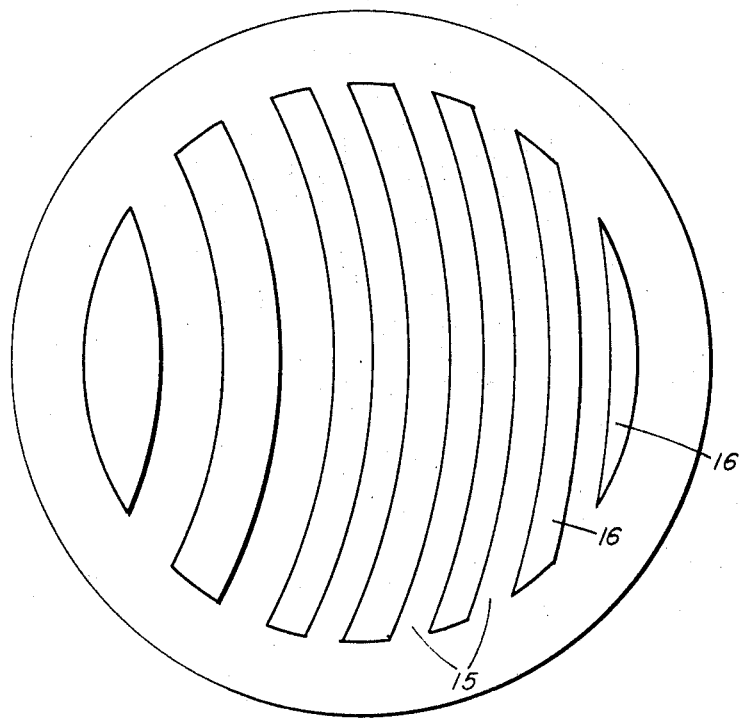
FIG. 3 illustrates an alternative embodiment of a zone plate for coding the radiation.

Referring now to FIGS. 1 through 3, there is shown a subject 10 having an organ such as a thyroid 11 whose condition is to be determined by obtaining an image thereof. For this purpose the subject has ingested a radioactive tracer which has an affinity for the particular organ so that there will be a larger amount of this compound in the organ than in the adjacent portions of the body. For example, in the case of the thyroid, compounds of iodine are readily absorbed and therefore radioactive molecules of iodine which are injected as a radioactive pharmaceutical will become distributed throughout the thyroid and emit gamma radiations. Since portions of the thyroid which are diseased absorb greater or less portions of the radioactive pharmaceutical, the resulting scintigraph is then useful in determining the condition of the thyroid.

Positioned a short distance from the subject 10 is a spatial modulating mask 13 which, as disclosed herein, is preferably an absorber of gamma radiation in accordance with the Fresnel pattern shown in FIG. 2. This pattern may, for example, be produced on an aluminum plate 14 appoximately 10 inches in diameter and 1/16 inch thick having deposited thereon a layer of lead 15 approximately 1/16 to ¼ of an inch thick depending on the radioactive isotope in the pharmaceutical. Rings of the lead plate 15 are removed as at 16 in accordance with the Fresnel zone formula in which adjacent areas are equal and the average radius of any area in the pattern is equal to the average radius of the area closest to the center multiplied by the square root of the number of that ring counted out from the smallest ring. In general, therefore, the areas 16 are made approximately equal to the areas 15.

The energy passing through the spatial modulating filter mask 13 impinges upon an energy converter such as a crystal of sodium iodide 17 which emits light in response to impact of high energy particles. The light which as shown here is picked up by photodetectors 18 which may be arranged in a hexagonal pattern in accordance with U.S. Pat. No. 3,011,057 issued Nov. 28, 1961 to H. O. Anger. The output of the photodetectors 18 is processed through a computer 19, which may be a resistive network as disclosed by Anger, to drive the deflection plates 20 of a cathode ray tube 21 having a control electrode 22 which is energized in accordance with the instantaneous light energy output from crystal 17. The display produced on the fluorescent screen 23 of the cathode ray tube 21 is recorded on a film 24 through a focusing lens 25 as a spatial code containing information of the location of the radioactive molecule in the thyroid 11 which emitted the high energy particle striking the crystal 17.

The zone plate of FIG. 3 is an off-center section of a zone plate of the type shown in FIG. 2 having ring radii of about twice the size of FIG. 2. If desired such a zone plate may be used to produce lateral displacement of components of the information when the informational pattern produced by the zone plate is subsequently being decoded.

Figure 4:
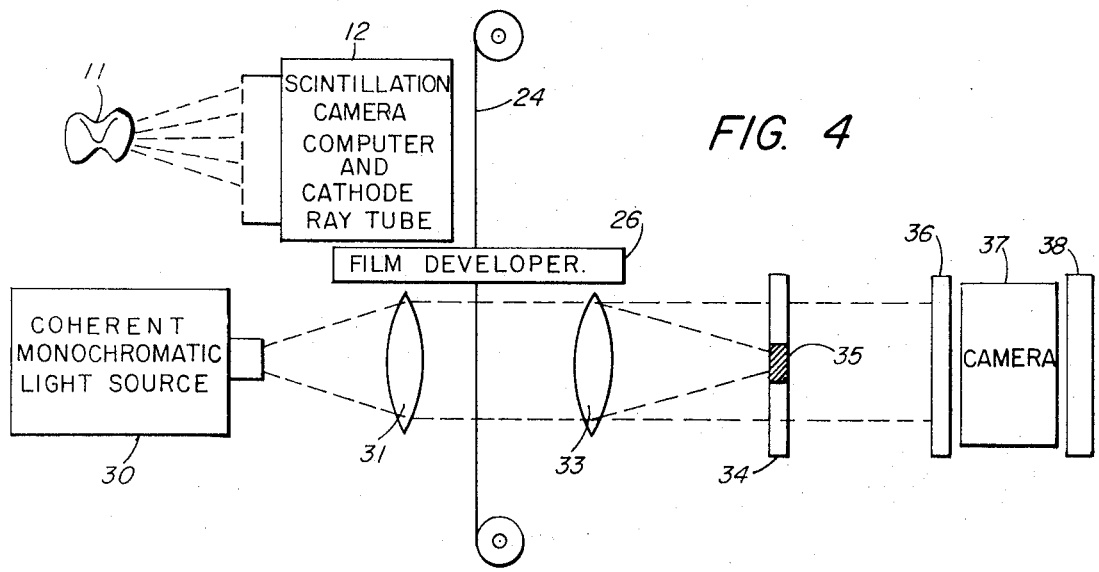
FIG. 4 illustrates a system in which nuclear radiation recorded in accordance with the system of FIG. 1 is decoded and displayed.

Referring now to FIG. 4, there is shown a system for forming the image of the thyroid 11 from the information recorded on the film 20 by the camera unit 12 of FIG. 1. A source of spatially coherent monochromatic light 30, such as a laser, is formed into a beam by a collimating lens 31 and projected through the film 24 which has been developed, after exposure by camera 12, by film developer 26. A stop 34 is positioned at the focal point of a converging lens 33 positioned beyond the film 24 such that in the absence of the film 20 the light will impinge on an opaque portion 35 of the stop 34. Due to diffraction of the light by the film 20, light will pass the stop 34 and impinge on a viewing screen 36 positioned at any desired distance beyond the focal point of lens 33 and stop 34 to produce an image of the object 11. By adjusting the position of the screen 36 from the film 24, any desired slice of the object 11, such as the front or back portion of the thyroid will become clearly visible on the screen 36 while the other slices of the thyroid will produce signals which are less effectively correlated by the decoding system of FIG. 3 and hence appear dispersed and not clearly visible on the viewing screen 36.

The image produced on screen 36 may be observed directly or photographed, if desired. For example, if screen 36 is a ground glass screen a camera 37 will focus the image on a film 38 which may be developed to any desired degree, with a frame of film for each location of the screen 36 so that a series of plates may be obtained each for different cross-sectional views of the organ 11. By adjusting the degree of development of each of the film frames 38, the dispersed portions of the organ which were not brought into focus may be eliminated from the finally developed film since they are many times weaker than the desired image and appear primarily as fog in a fully developed film so that underdeveloping the film causes them not to appear in the developed film.

Alternatively, camera 37 may be a television pickup tube which feeds a cathode ray tube display whose brightness can be controlled to eliminate the low intensity fog from the defocused portions of the nuclear source.

In addition, since the film 24 contains essentially three-dimensional information, stereo pairs of images may be obtained, for example, by appropriate processing through a computer and such stereo pairs can be viewed together through a three-dimensional viewer with the picture observed by one eye of the viewer corresponding to viewing the object 11 in one direction and the picture observed by the other eye of the observer corresponding to viewing the object 11 in a different direction so that the observer can have an instantaneous three-dimensional or perspective view of the organ 11.

Figure 5:
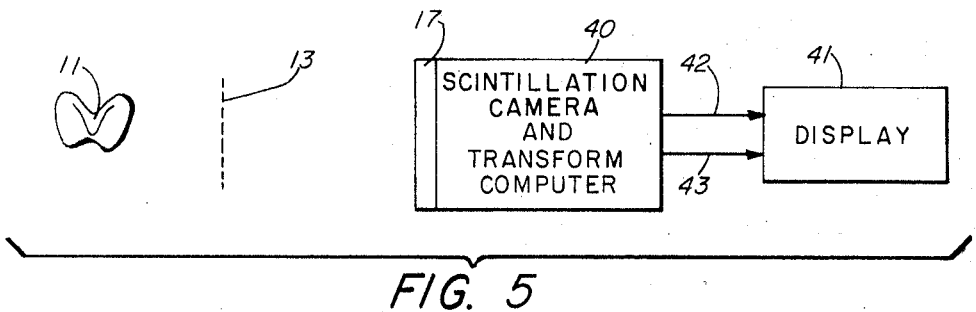
FIG. 5 illustrates diagrammatically an alternative embodiment of the system wherein the coded information is decoded directly for display.

Referring now to FIG. 5, there is shown an embodiment of the invention wherein the coded pattern is processed directly from the output of the nuclear camera. The nuclear source 11 produces particles which pass through the zone plate 13 coded in accordance with the patterns of FIGS. 2 or 3 and are detected by a scintillation crystal 17 to produce light flashes which are detected by a scintillation camera portion of the unit 40 which includes, for example, photo-detectors of the type shown in FIG. 1 to detect the light flashes and to supply pulses of energy to the computer. As illustrated herein, the pulses of energy from each detector are fed into the computer to be stored and processed to produce the data transformation equivalent to that produced optically by the structure of FIG. 4. The transformed information is then fed to a display 41 which may be, for example, of the cathode ray tube type, by means of a video line 42, and the timing of the scans of the computer memory and the display is synchronized by means of a synchronizing line 43. It is to be clearly understood that any appropriate computer program can be used. However, preferably the computer portion of the unit 40 is a digital unit such that each burst of light produced by the crystal 17 signal outputs from the photo-detectors, which are measured in amplitude and recorded in the computer memory as binary quantities whose relative amplitudes are determined by the crystal location producing the burst of light. The binary quantities stored during the period of exposure of the crystal 17 to the source 11 are read out of the computer memory and processed in accordance with any desired computer program which sums the relative intensities of the light at each location to produce an overall hologram pattern which is then transformed in accordance with well-known principles to produce an image of source 11 as data in an output memory of the computer which can be scanned in synchronism with the display 41 to transfer the image to the display 41. Preferably, the output memory is of the well-known nondestructive readout type such that it can be scanned many times to continuously display its output on the display 41 as long as desired for observation or for exposure of a film. The computer may also be used to reduce the intensity in the output of data corresponding to distances of the object 11 from the zone plate 13, other than the desired distance, so that a particular slice of the object 11 can be observed. By reprogramming the computational steps in the computer, different slices of the object 11 may be sequentially observed by sequentially processing the same data stored in the computer from the output of the crystal 17 in accordance with the program required to produce a focused image of each slice of the object 11.

Figure 6:
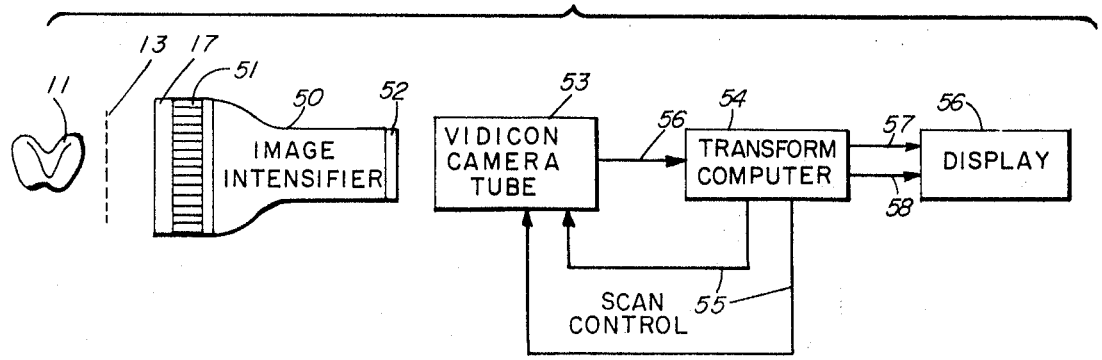
FIG. 6 illustrates a modification of the system wherein the coded information is fed directly to a camera pickup system for decoding by a computer.

Referring now to FIG. 6, there is shown a further embodiment of the invention wherein the object 11 and zone plate 13 produce a nuclear image pattern detected by a crystal 17 whose light is coupled to an image intensifier 50, for example, by means of fiberoptics coupler 51 to produce a visible image on a fluorescent screen 52 of image intensifier 50. This image, which is a hologram, may be used to expose a film directly to be then processed optically, for example, by the system shown in FIG. 4. Alternatively, a vidicon camera tube 53 may be used to pick up the image produced on fluorescent screen 52. Preferably, fluorescent screen 52 is of the long persistence type so that scintillations of light produced by the crystal 17 will be integrated during an exposure period of the crystal 17 through the zone plate 13 to the nuclear source 11. Camera tube 53 is scanned in accordance with a predetermined program by means of control signals derived from a computer 54 through lines 55 and the output of the camera tube 53 is fed to the computer by a video line 56. If desired, camera tube 53 may be of the storage type to augment the persistence of the screen 52 so that tube 53 becomes the primary data storage system for the computer 54. After suitable transformation of the data in a manner similar to that discussed above in connection with FIG. 5, the output data is stored in an output memory, which, if desired, may also be a storage tube, whose output is fed to a display 56 via a video line 57. Scanning of display 56 is synchronized by a signal fed to display 56 from computer 54 by line 58.

The output of display 56 may, if desired, be recorded on film or alternatively the outputs of camera tube 53 and/or the output of computer 54 may be recorded on video tape to be subsequently processed and/or displayed.

This completes the description of the embodiments of the invention illustrated herein. However, many modifications thereof will be apparent to persons skilled in the art without departing from the spirit and scope of this invention. For example, the transparent portions of plate 13 may be of any desired material which does not substantially absorb or scatter gamma rays such as plastic, beryllium, magnesium or boron nitride; and the opaque portions could be tungsten, uranium, gold or platinum which could be self supporting with small rings in ten connecting segments. Accordingly, it is intended that this invention be not limited to the particular details of the embodiments illustrated herein except as defined by the appended claims.

What is claimed is:

1. The method comprising the steps of:
   introducing radioactive material into an organ of a living body;
   forming a spatially coded pattern of high energy particles emitted from said radioactive material with a spatial code having at least a component which is substantially symmetrical about an axis substantially parallel to the average direction of motion of said particles by directing said particles through a structure comprising a plurality of regions of different sizes substantially permeable to said particles separated by intervening differently spaced regions substantially less permeable to said high energy particles than said substantially permeable regions, with the average thickness of said less permeable regions in a direction along said axis being on the same order of magnitude as the average of said spacings in a direction transverse to said axis;
   spatially detecting at least a portion of said pattern; and
   deriving an image of said radioactive material in said organ from said spatial detection of said pattern.

2. The method in accordance with claim 1 wherein said spatially coded pattern is formed at least in part by selectively absorbing certain of said particles as a function of said spatial code, with particles emitted from any point in said radioactive material passing through any of a majority of said apertures.

3. The method in accordance with claim 2 wherein said spatially detecting step comprises converting the energy level of said nuclear particles radiated from said organ to radiation of a lower intensity than the intensity of said nuclear particles.

4. The method in accordance with claim 2 wherein said image deriving step comprises recording a spatial pattern having at least a component of said spatially coded pattern and deriving an image therefrom with a beam of substantially coherent light.

5. The method in accordance with claim 1 wherein said detection comprises producing electrical signals in response to the detection of said nuclear particles.

6. The method comprising the steps of:
introducing radioactive material into an organ of a living body;
spatially coding high energy particles emitted from said radioactive material in accordance with a spatial coding pattern having at least a component which is substantially symmetrical about an axis parallel to the average direction of motion of the spatially coded pattern of said particles;
forming a spatially coded pattern of high energy particles emitted from said radioactive material with a spatial code having at least a component which is substantially symmetrical about an axis substantially parallel to the average direction of motion of said particles by directing said particles through a structure having a plurality of regions substantially permeable to said particles separated by differently spaced intervening regions substantially less permeable to said high energy particles, with the thickness of said regions in a direction parallel to said axis being less than the largest of said spacings in a direction perpendicular to said axis; and
spatially detecting said spatially coded pattern of high energy particles.

7. The method in accordance with claim 6 wherein:
said spatial coding step comprises absorbing certain of said particles by said coding structure as a function of said spatial code; and
the distance between said radioactive material and said coding structure is on the same order of magnitude as the distance between the coding structure and the region where said spatially coded pattern is detected.

8. The method in accordance with claim 6 wherein at least a component of said spatially coded pattern comprises at least a portion of a Fresnel zone pattern.

9. The method in accordance with claim 6 wherein at least a component of said pattern comprises an off-center section of a Fresnel zone pattern.

10. The method in accordance with claim 9 wherein said spatially detecting step comprises producing electrical signals.

11. The method in accordance with claim 9 wherein the spatial frequency response of the detection is matched to at least a component of said spatially coded pattern.

12. Apparatus for detecting a spatially coded pattern of radiation having an energy level above visible radiation derived from a radiopharmaceutical selectively absorbed by an organ of a living body comprising:
means for forming a spatially coded pattern of high energy particles emitted from a plurality of areas of said radiopharmaceutical with a spatial code having at least a component which is substantially symmetrical about an axis substantially parallel to the average direction of motion of said particles comprising a structure having a plurality of regions of different sizes substantially permeable to said particles separated by intervening regions of different sizes which are substantially less permeable to said high energy particles than said permeable regions, with the thickness of said intervening regions in a direction parallel to said axis being less than the average width of said intervening regions in a direction perpendicular to said axis; and
means for spatially detecting at least a portion of said pattern.

13. The apparatus in accordance with claim 12 wherein:
the spacing of said permeable regions and said thickness of said intervening regions permit high energy particles emitted from a point in said radiopharmaceutical in said organ to pass through any of the majority of said apertures.

14. The apparatus in accordance with claim 12 wherein: said permeable regions are of different arcuate sizes.

15. The apparatus in accordance with claim 12 wherein:
said spatial code has spatial frequencies lying in the same frequency range as the majority of the spatial frequency components of the spatial informational content of said particles emitted from the radiopharmaceutical.

16. The apparatus in accordance with claim 15 wherein:
said regions are of different arcuate sizes.

17. The apparatus in accordance with claim 16 wherein:
said coding structure comprises a mask forming at least a portion of a Fresnel zone pattern.

18. The apparatus in accordance with claim 17 wherein:
said mask forms the off-center section of a Fresnel zone pattern.

19. The apparatus in accordance with claim 18 wherein:
said detecting means comprises means for converting said high energy particles to radiation of a lower energy level and means for spatially detecting said lower energy level.

20. The apparatus in accordance with claim 19; and means for reproducing an image of the locations of said radiopharmaceutical in said organ from said spatially detected pattern.

* * * * *